United States Patent [19]

Rudi et al.

[11] Patent Number: 5,430,991
[45] Date of Patent: Jul. 11, 1995

[54] DATA CARRIER MAGAZINE AND OPENING MECHANISM

[75] Inventors: Guttorm Rudi, Fjellhamar; Halvor O. Kvifte, Haslum; Ornulf Jansen, Fjellhamar, all of Norway

[73] Assignee: Tandberg Data Storage, Oslo, Norway

[21] Appl. No.: 51,222

[22] Filed: Apr. 23, 1993

[51] Int. Cl.⁶ .......................... B65B 5/10; B65B 23/00; B65B 43/38
[52] U.S. Cl. .................... 53/382.1; 53/381.1; 414/935; 414/940
[58] Field of Search ............... 53/382.1, 381.1, 492, 53/468, 50; 206/307; 414/937, 938, 940, 935

[56] References Cited

U.S. PATENT DOCUMENTS

| | | |
|---|---|---|
| 995,487 | 6/1911 | Scholl . |
| 1,120,872 | 12/1914 | Weis . |
| 3,429,629 | 6/1967 | Cilia .............................. 206/309 |
| 3,561,004 | 5/1969 | Kozu et al. ...................... 206/387 |
| 4,047,624 | 9/1977 | Dorenbos ...................... 414/935 X |
| 4,539,794 | 9/1985 | Azzaroni .................... 53/382.1 X |
| 4,613,041 | 9/1986 | Carlton .......................... 206/373 |
| 4,811,546 | 3/1989 | Takashima et al. ........... 53/382.1 |
| 4,923,352 | 5/1990 | Tamura et al. .............. 414/940 X |
| 5,182,687 | 1/1993 | Campbell et al. ................. 360/92 |
| 5,283,945 | 2/1994 | Bigelow et al. ............. 53/382.1 X |
| 5,330,301 | 7/1994 | Brancher .................... 414/940 X |

FOREIGN PATENT DOCUMENTS 2-96965  4/1990  Japan ............................ 360/92

Primary Examiner—James F. Coan
Attorney, Agent, or Firm—Hill, Steadman & Simpson

[57] ABSTRACT

A magazine for data carriers, for use with a rotatable opening element, has a housing with a box-like base, the base having an open top and a cover formed by separable cover halves being disposed over the top of the base. The base has at least one receptacle therein for receiving a data carrier, such a magnetic tape cartridge. The magazine is intended for insertion in a data reader, which removes the data carrier from the magazine and inserts it in a drive for reading the data therefrom. The halves of the housing are mounted on the base for respective rotation around first and second axes parallel to a longitudinal edge of the base, and disposed inwardly of all edges of the base. A rotatable opening element is engageable with at least one of the housing halves to cause the housing halves to rotate around their respective axes, when the magazine is moved toward the opening element, to move the halves apart, over the sides of the base, to open the magazine to permit removal of a data carrier therefrom. Moving the magazine away from the opening element causes the halves to rotate to their closed position. The cover halves each carry half of a handle thereon, so that when closed they provide a complete handle for carrying the magazine with data carriers therein.

4 Claims, 4 Drawing Sheets

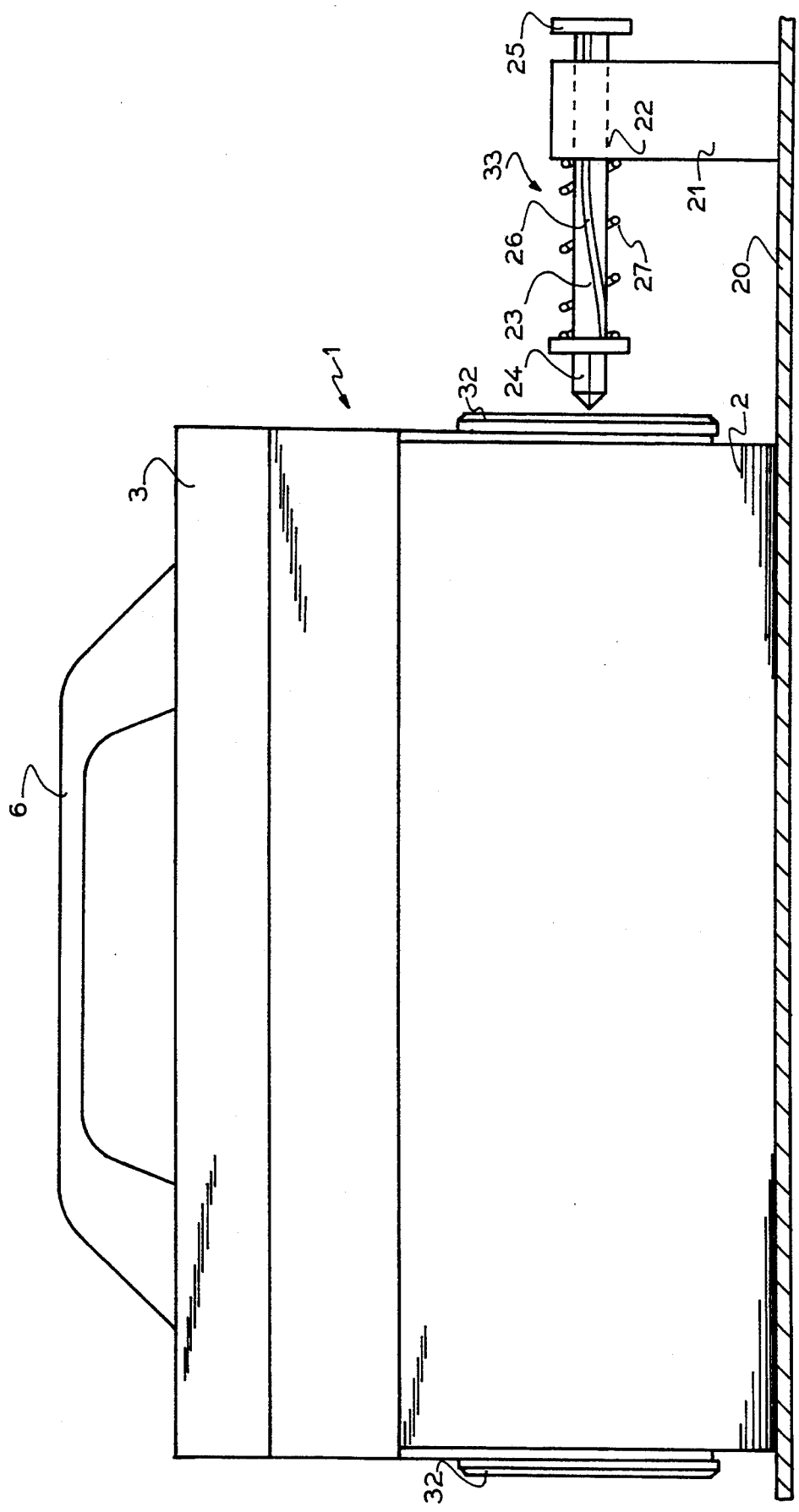

DATA CARRIER MAGAZINE AND OPENING MECHANISM

BACKGROUND OF THE INVENTION

1. Field of the Invention

The present invention is directed to a magazine for carrying a plurality of data carriers, such as magnetic tape cartridges, of the type insertable in a loading device having a data reader, for selective removal of one of the data carriers from the magazine for use in said reader.

2. Description of the Prior Art

It is known to record and store data on a number of different types of storage media, such as magnetic tape, optical disks and the like. Because of the limited size of such data carriers, the amount of data which can be stored thereon is similarly limited. In computing and data retrieval systems wherein a large amount of data is stored, a relatively large number of such data carriers are required in order to contain all of the necessary data. To retrieve the data from the data carrier, it is necessary to insert the carrier into a data reader, such as a tape drive unit. (As used herein, the unit into which the data carrier is inserted will be referred to as a "reader," although it may also be used for the purpose of writing data on the carrier.)

In systems requiring multiple data carriers, it is cumbersome to manually successively insert and remove the data carriers from the reader. Many such systems, therefore, employ a data carrier magazine, which holds a large number of data carriers, with the magazine being loadable into a device which contains the reader. A selected data carrier can then be removed from the magazine, and inserted into the reader wherein the data on the carrier is read, or new data is written on the carrier. After the completion of the read or write operation, the data carrier is then automatically removed from the reader and is replaced in the magazine. The device which removes the data carrier from the magazine, inserts it in the reader, and removes it from the reader and replaces it in the magazine is generically known as a "loader." Loaders can generally be classified into three types: those in which the magazine is stationary in the loader and the drive is moved over the magazine to the position of a selected data carrier in the magazine, those wherein the reader is stationary and the magazine is moved to position a selected tape at a location for insertion in the reader, and those wherein both the magazine and the reader are stationary, and an "elevator" or other type of data carrier transfer mechanism is used to remove a selected data carrier from the magazine, transport it to, and insert it in the reader. Various combinations of these three basic types of units are also known.

The configuration of the magazine used in a particular system is, to a certain extent, dictated by the structural details of the loader in which it will be used. A magazine for tape cartridges is disclosed in U.S. Pat. No. 5,182,687, for example, which is designed to move vertically in a loader relative to a horizontally disposed reader. A tray-type magazine for magnetic tape cassettes is disclosed in U.S. Pat. No. 3,561,004 having an open top and sidewalls with sets of cooperating channels therein for receiving tape cassettes so as to be vertically insertable and removable relative to the tray. A system wherein a loader having a magazine with a plurality of vertically oriented tape cartridges therein is disclosed in Japanese Patent 2-96965, wherein the magazine is stationary and a reader is positioned over the magazine to remove a selected cartridge therefrom.

Known magazines for use in conventional loaders are typically open at a side thereof at which the data carriers are inserted and removed. When the magazine is not in the loader, however, it is desirable for the data carriers contained therein to be protected against dirt and damage to the data carriers which may arise during transport or storage of the magazine. Conventional magazines may therefore be provided with a manually removable cover, which can be placed over the opening, and which must be removed and set aside when the magazine is placed in the loader. It would be desirable to provide a magazine with a cover which is permanently attached thereto, however, this presents the problems of providing a mechanism in the loader for opening the cover, and providing room within the loader to accommodate the cover in its open position.

SUMMARY OF THE INVENTION

It is an object of the present invention to provide a magazine for data carriers having a permanently attached cover which is automatically openable in a simple manner upon insertion of the magazine in a loader and wherein the cover, when opened, occupies a minimum of additional space within the loader.

It is a further object of the present invention to provide such a magazine wherein the cover provides an easily accessible handle for carrying the magazine.

It is a further object of the present invention to provide such a magazine which is configured so as to be completely closeable only when all data carriers therein are correctly oriented in their respective receptacles, and which provides a visual indication if such is not the case.

The above objects are achieved in accordance with the principles of the present invention in a magazine for data carriers for use with a rotatable opening element, the latter preferably being disposed in a loader adapted to receive the magazine therein. The magazine has a cover which is openable and closeable by means of engagement with said rotatable opening element.

More specifically, the magazine itself is in the form of a housing with a box-like base having an open top, with a cover disposed over the top. The base has at least one receptacle therein for receiving a data carrier, the receptacle having an open top disposed at the top of the base for permitting insertion and removal of a data carrier relative to the receptacle. Preferably, the magazine has a plurality of such receptacles for respectively holding a plurality of standardized data carriers, such as magnetic tape cartridges, and more specifically, such as quarter-inch magnetic tape cartridges.

The cover is formed of first and second separable halves, both mounted on the base for respective rotation around first and second axes parallel to a longitudinal edge of the base. The cover halves are rotatable by said opening element in a first direction, which causes the halves to move apart to expose the top of the base and the data carriers therein, and in an opposite direction for causing the halves to move together to cover the top of the base and the data carriers therein. The axes about which the cover halves respectively rotate are disposed inwardly of the edges of the base, so that the cover halves, when rotated move over a side of the base, so as to occupy little additional space beyond the space occupied by the magazine in its closed state.

Various embodiments are disclosed for means for transferring rotational motion from the rotatable opening element to the cover halves. In all embodiments, the rotatable opening element is mechanically engageable with at least one of the cover halves. In a preferred embodiment, only one of the cover halves is engaged by the opening element, by means of a keyed receptacle in that cover half which receives a free end of the opening element. The keyed configuration causes the cover half, when the opening element is received in the receptacle, to co-rotate with the opening element in the same direction as the opening element. The cover halves are provided with meshing teeth, so that rotation of the cover half engaged with the opening element causes rotation of the other cover half about its axis in the opposite direction.

In a further embodiment, each cover half is provided with a keyed receptacle, and two rotatable opening elements are used, respectively engageable in the keyed receptacles so that each cover half is positively driven by its own opening element. In this embodiment, the cover halves are still provided with meshing teeth, even though such teeth are not necessary to transfer rotary motion, so that the cover halves open and close in a synchronized manner.

In any of the embodiments, the magazine may be provided with a spring clip engaging and disposed between the two cover halves for normally urging the halves together toward a closed position.

The cover halves may have a configuration so that the opening and closing thereof resembles the opening and closing of a clam shell. The cover halves thus open toward the opposite sides of the magazine and occupy a minimum of additional space outside of the magazine when completely opened. Data carriers are then removed and inserted relative to the magazine between the open cover halves.

Each cover half may be provided with a half of a handle, the handle halves forming a complete handle when the cover halves are completely closed, causing the handle halves to abut. The plane separating the handle halves is thus coincident with the edges separating the cover halves.

It is important that the data carriers each be disposed within their respective receptacle in a known orientation, so that when the magazine is inserted into the loader, the data carriers will be properly oriented for removal and insertion into the reader. In an embodiment for use with tape cartridges, which are standardized, the magazine cover halves are each provided with projections which extend inwardly at locations on the cover halves disposed next to the sides of a tape cartridge inserted in a receptacle in the magazine. Standardized tape cartridges, such as quater-inch cartridges, have openings or relieved regions (for other purposes) at these side locations. The projections are configured and located so as to extend into these openings or relieved regions only when the tape cartridge is properly oriented within the receptacle. In order for the cover halves to completely close, the projections must be engaged in the openings or relieved regions. If any tape cartridge in the magazine is improperly oriented in its receptacle, the projections next to that receptacle will not engage the opening or relieved region, and will instead abut against the edge of the cartridge, thereby preventing complete closure of the cover halves. The incomplete closure of the cover halves is easily visually perceptible, and thus provides an immediate indication of the incorrect orientation of a tape cartridge.

The cover halves may consist of transparent plastic, so that the number of tape drives in the magazine, plus any labeling thereon, can be seen without opening the cover.

The rotatable opening element in a preferred embodiment is formed by a stationary support, preferably disposed inside the loader at a location so that, as the magazine is slid into the loader toward a final position within the loader, the opening element engages the keyed receptacle of one cover half during the last portion of the sliding movement of the magazine. An axle, having a free end keyed to match the keyed receptacle in the cover half, is mounted in the stand in an opening for rotation in the opening. The axle has at least one helical flight at its exterior, which engages a stationary, complementary element in the opening. The end of the axle opposite its free end has a stop which cannot pass through the opening. The axle is surrounded by a spring normally urging the stop against the support. As the magazine is slid into the loader, and after it engages the opening element, the continued movement of the magazine pushes the axle through the opening against the spring force. The helical flight on the exterior of the axle, engaged with the stationary element, cause the axle to rotate as it is being forced backward, thereby automatically opening the cover. When the magazine is removed from the loader, the spring forces the axle in the opposite direction, i.e., in the same direction as the magazine is removed, thereby causing rotation of the axle in the opposite direction to automatically close the cover halves as the magazine is removed. The cover halves are completely closed by the time the magazine becomes disengaged from the opening element.

DESCRIPTION OF THE DRAWINGS

FIG. 4 is a side elevational view of a data carrier magazine and a cooperating opening element constructed in accordance with the principles of the present invention.

DESCRIPTION OF THE PREFERRED EMBODIMENTS

Figure 1:
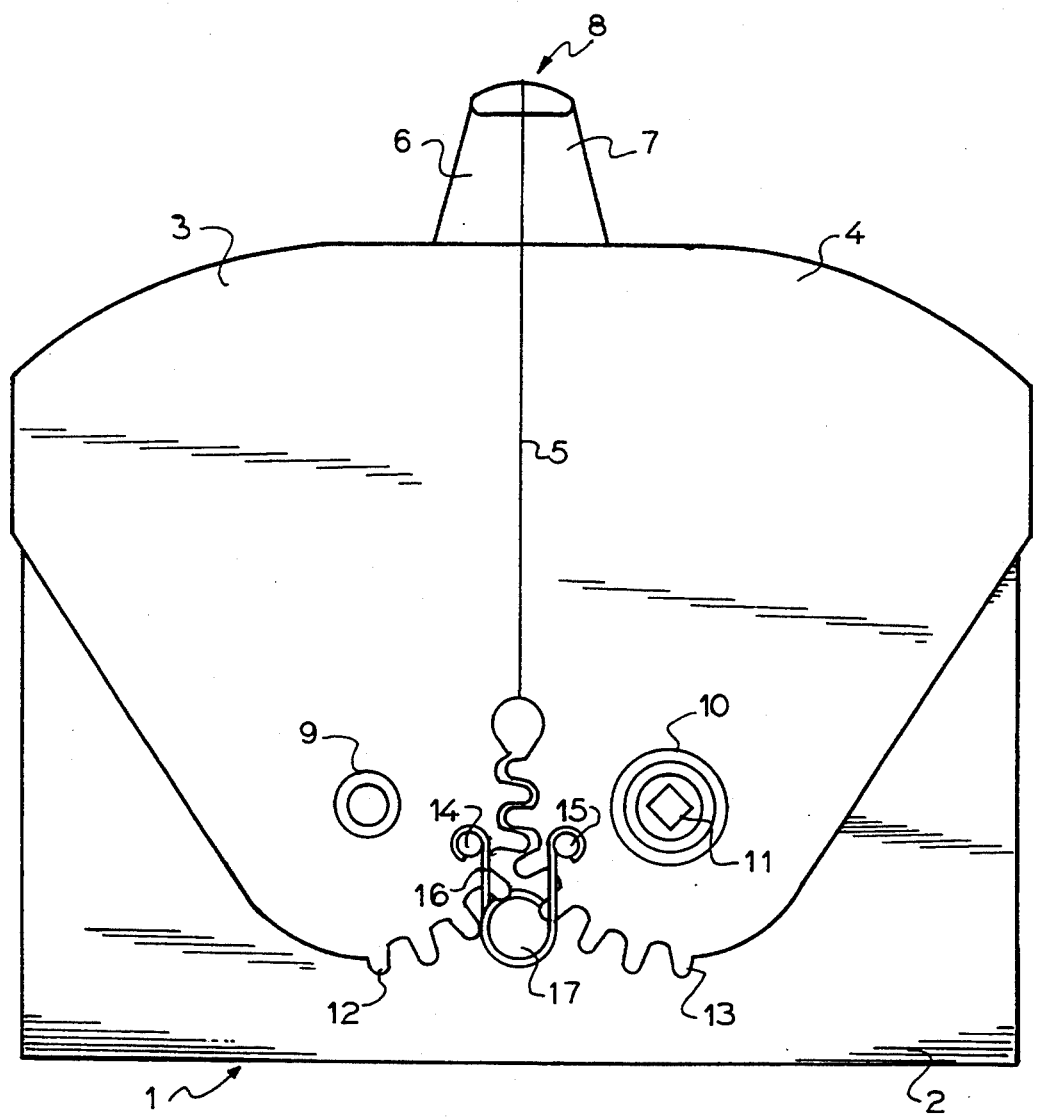
FIG. 1 is an end elevational view of a data carrier magazine constructed in accordance with the principles of the present invention.
Figure 5:
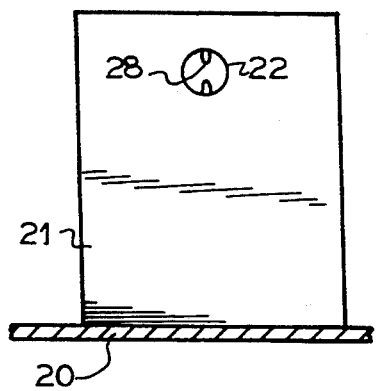
FIG. 5 is an end elevational view of the support for the opening element of FIG. 4.

A data carrier magazine 1 constructed in accordance with the principles of the present invention is shown in a first embodiment in FIG. 1. The exemplary embodiments of the data carrier magazine described herein will be in the context of a magazine for magnetic tape cartridges as the data carriers, however, it will be understood that the magazine may be used for any type of data carrier, and is not limited to tape cartridges.

The magazine 1 includes a box-like base 2 having an opened top which is closed by a cover formed by cover halves 3 and 4. The base 2 has a plurality of edges, including a longitudinal edge, for example edge 2a designated in FIG. 2. The cover halves 3 and 4 are separable along a plane 5. The cover half 3 has a handle half 6 at a top exterior thereof, and the cover half 4 has a handle half 7 at a top exterior thereof. When the cover halves 3 and 4 are closed so as to abut each other at the plane 5, the handle halves 6 and 7 also abut, and form a complete handle 8.

The cover half 3 is journaled on the base 2 for rotation around a bearing 9, and another bearing disposed at the other end of the base 2 (not visible in FIG. 1) on the same axis as the bearing 9. The cover half 4 is journaled on the base 2 with a bearing 10, and another bearing disposed on the same axis at the opposite end of the base 2. In the embodiment of FIG. 1, only the bearing 10 has a centrally disposed, keyed receptacle 11. The respective axes on which the bearing sets for the cover halves 3 and 4 are disposed, and about which the cover halves 3 and 4 respectively rotate, and both parallel to the longitudinal edge 2a. Moreover, since these axes are disposed inwardly from all edges of the base 2, the cover halves 3 and 4, when open, are disposed over the sides of the base 2, so as to occupy little additional space.

The cover half 3 has a set of teeth 12 and the cover half 4 has a set of teeth 13. As described in more detail below, as one cover half, such as the cover half 4 is rotatably driven, the sets of teeth 12 and 13 mesh so that the other cover half, such as the cover half 3, is rotated in an opposite direction.

The cover halves 3 and 4 are normally urged together toward the closed position shown in FIG. 1 by a spring clip 16, having free ends which engage respective pins 14 and 15 on the cover halves 3 and 4, and a central region surrounding a pin 17 on the base 2. The bearings, teeth and spring can be covered by end covers 32 (which, although normally visible have been omitted in FIG. 1 for clarity).

Figure 2:
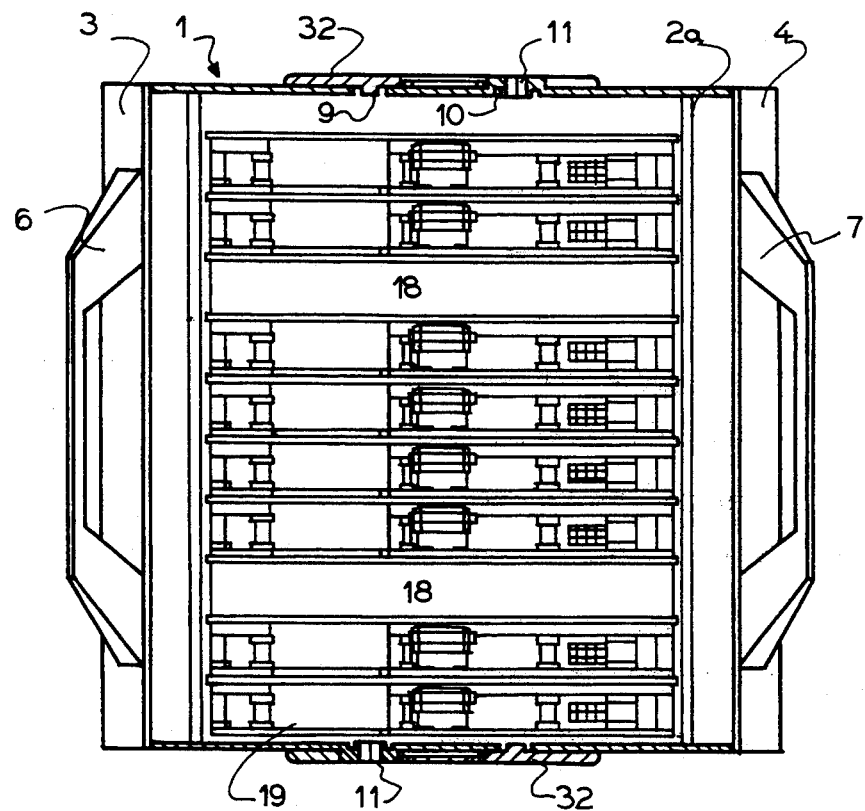
FIG. 2 is a plan view of the data carrier magazine of FIG. 1 with the cover opened.

The magazine 1 is shown with the cover in an open position in FIG. 2, so that the interior of the magazine 1 is exposed. As can be seen in FIG. 2, the magazine 1 contains a plurality of data carrier receptacles 18, each of which has an open top which is exposed when the open top of the base 2 is exposed by opening the cover halves 3 and 4. Each data carrier receptacle 18 is sized to receive and hold one data carrier 19, such as a magnetic tape cartridge. As can also be seen in FIG. 2, the set of two bearings for each cover half 3 and 4 includes one normal bearing 9 and one keyed bearing 10, with the keyed bearing 10 being disposed at opposite ends of the magazine 1. This permits the magazine 1 to be inserted in a loader, as described in more detail below, with either end first so as always to present a keyed bearing 10 at a position engageable with an opening element (as shown in FIG. 4).

Figure 3:
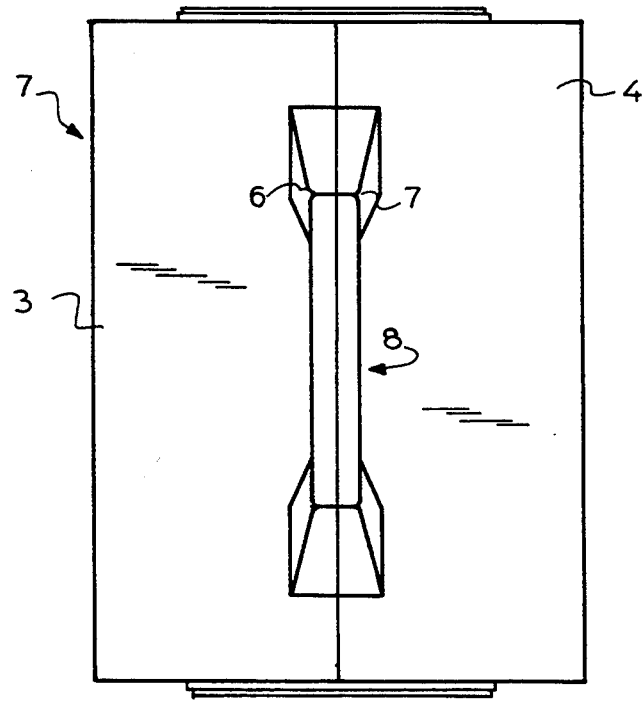
FIG. 3 is a plan view of the data carrier magazine of FIG. 1 with the cover closed.

The magazine 1 is shown with the cover closed in FIG. 3. As indicated in FIGS. 1 and 3, at least the tops of the cover halves 3 and 4, and preferably the sides as well, are transparent.

The magazine 1 is shown in FIG. 4 as it will be inserted in a loader, the base of the loader being indicated at 20. The loader will be of the type having a movable reader (not shown) which will be positioned above the magazine 1 when the magazine 1 is inserted in the loader. The reader is movable along the length of the magazine 1 to a selected position to remove a desired data carrier 19 from the magazine 1. The magazine 1 is inserted into the loader in a direction toward the right of FIG. 4, and is shown in FIG. 4 just before engaging a rotatable opener 33 disposed in the loader. The rotatable opener 33 has a stationary support 21 attached to the loader base 20. The support 21 has a bore 22 extending therethrough, in which an axle 23 is disposed. The axle 23 has a keyed free end 24 having a shape corresponding to the shape of the receptacle 11 in the bearing 10. The opposite end of the axle 23 has a stop 25 thereon, having a size preventing it from passing the bore 22. The axle 23 is normally urged with the stop 25 abutting the support 21 by a spring 27.

When the receptacle 11 engages the free end 24 of the axle 23 as the magazine 1 is moved toward the right in FIG. 4 during insertion of the magazine 1 into a loader, the continued movement of the magazine 1 toward the right pushes the axle 23 toward the right as well, against the force of the spring 27. The axle 23 is provided with helical flights 26 thereon. In the embodiment shown in FIG. 4, the flight 26 is a groove or channel in the surface of the axle 23. The bore 22 has one or more complementary projections 28 extending into the interior of the bore 22 which ride in the flight 26. As the continued motion toward the right of the magazine 1 pushes the axle 23 toward the right, the engagement of the projections 28 with the flight 26 translates the linear motion of the magazine, imparted to the axle 23, into rotary motion and the axle 23 rotates. Because of the mating shapes of the free end 24 and the receptacle 11, the rotation of the axle 23 causes rotation of the cover half 4 around the bearing 10. The meshing sets of teeth 12 and 13 cause the other cover half 3 to rotate around the bearing 9 in the opposite direction, thereby opening the cover and exposing the interior of the magazine 1. The magazine thereafter remains stationary in the loader, until it is removed.

When the magazine 1 is removed by displacing the magazine 1 toward the left in FIG. 4, the spring 27 forces the axle 23 toward the left as well, maintaining the free end 24 and the receptacle 11 in engagement. Because the axle 23 is moving in the opposite direction, however, it will rotate in a direction opposite to its previous direction of rotation, thereby automatically rotating the cover halves 3 and 4 to their closed position. By the time the magazine 1 again reaches the position shown in FIG. 4 as it is being withdrawn from the loader, the halves 3 and 4 have been rotated a sufficient amount by the axle 23 to be in the closed position, and any small amount of closing force which may still be necessary can be supplied by spring clip 16.

Although not separately shown, it will be understood that the flight 26 in the axle 23 may be a projection on the axle 23, instead of a groove, in which case the bore 22 will be provided with grooves to receive the projection, so that the same rotary motion is achieved.

In addition to serving as a means for transferring rotary motion from one cover half to another, the meshing sets of teeth 12 and 13 insure that the cover halves will be opened and closed in a synchronized manner.

As can be seen in FIG. 2, when the cover halves 3 and 4 are in the open position they are disposed at the sides of the magazine 1, but occupy little additional space beyond the sides of the magazine 1, and therefore a minimum of additional space must be provided in the loader in order to accommodate the cover in the open position. When the cover halves 3 and 4 are in the closed position, the mating handle halves 6 and 7 provide a convenient handle 8 by which the magazine can be lifted and transported.

Figure 6:
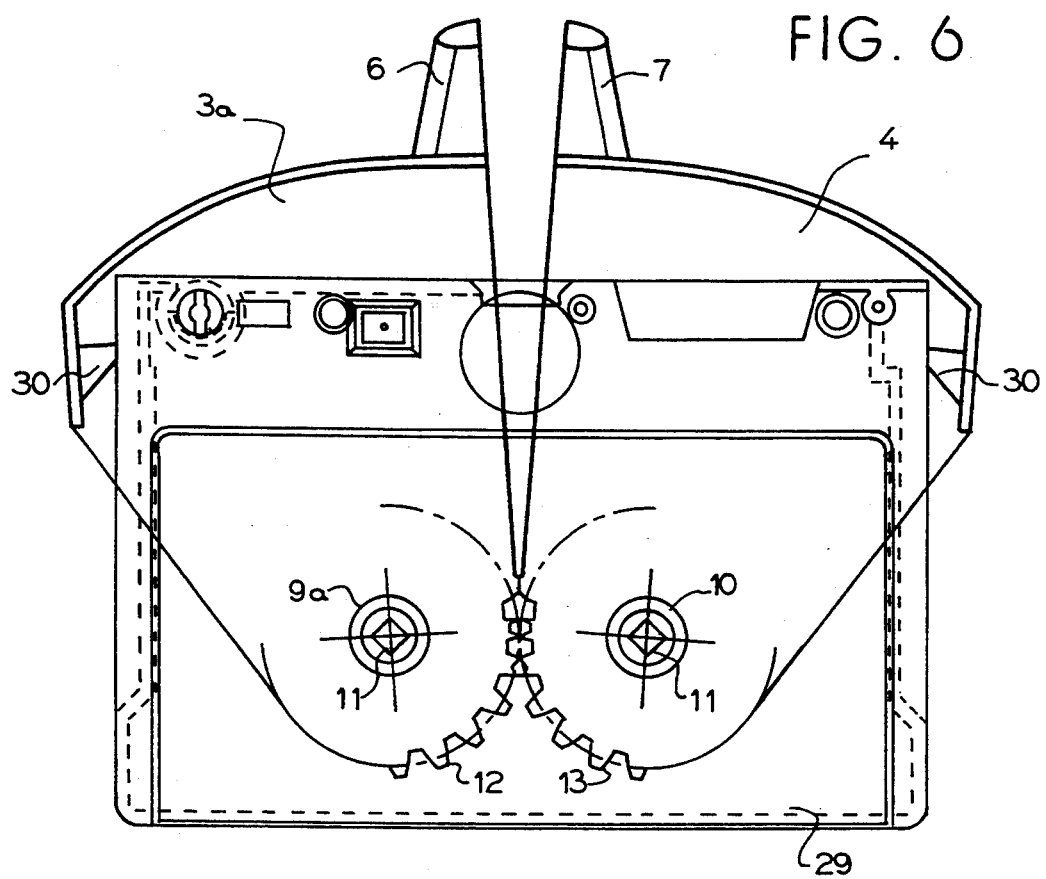
FIG. 6 is a schematic end elevational view of a further embodiment of the cover halves for a magazine constructed in accordance with the principles of the present invention, also showing engagement of the cover halves with an incorrectly oriented tape cartridge.

A further embodiment of the magazine is schematically shown in FIG. 6, which shows only the cover halves relative to a data carrier, in this case a standardized tape cartridge 29. The base 2 and the remainder of the magazine 1 have been omitted in FIG. 6 for clarity.

As can be seen in the embodiment of FIG. 6, the cover half 4 is as shown in the first embodiment, but the other cover half 3a is modified so that it has a keyed bearing 9a at the same end as the keyed bearing 10 of the cover 4. The keyed bearing 9a has a receptacle 11 identical to the receptacle 11 of the bearing 10. The magazine shown in FIG. 6 can thus be opened with two side-by-side openers 32 disposed in the loader, with cover halves 4 and 3a being positively driven, instead of the cover half 4 being used to transfer rotary motion to the other cover half. The sets of teeth 12 and 13 are thus not needed primarily for rotary motion transfer, but are still useful for synchronizing the opening and closing of the cover halves 4 and 3a.

As can also be seen in FIG. 6, each cover half has a plurality of interior projections 30 extending inwardly from an interior surface of each cover half. Although only the endmost ones of the projections 30 can be seen in FIG. 6, there is a projection 30 on each cover half at each data carrier receptacle 18 in the magazine 1. The projections 30 are disposed at sides of the cover halves 3 and 4, so as to project, respectively toward the sides of the standardized tape cartridge 29. The standardized tape cartridge 29, such as a quarter-inch tape cartridge, has a configuration so that if the cartridge 29 is inserted in the magazine 1 in the manner shown in FIG. 6, the sides of the cartridge 29 present a continuous surface to the projections 30, so that the projections 30 abut the sides, preventing the cover halves 4 and 3a from completely closing. The incomplete closing of the cover halves provides a visual indication that the cartridge 29 has been inserted incorrectly in the magazine 1.

Figure 7:
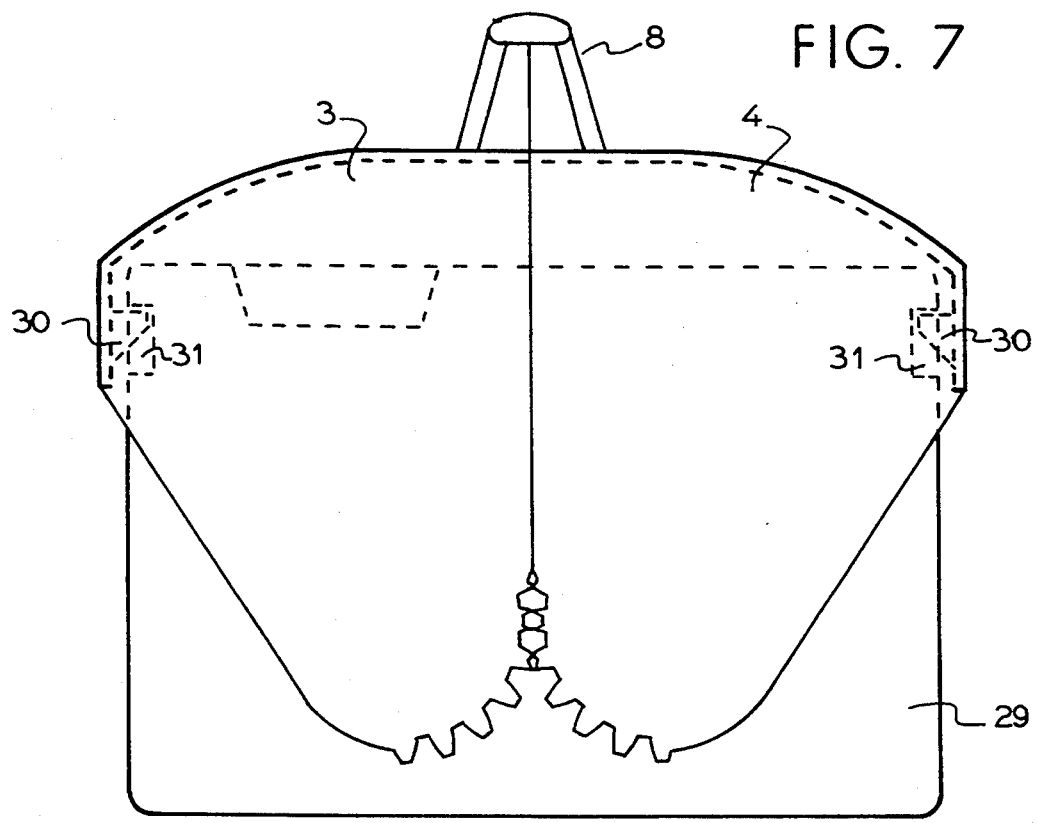
FIG. 7 is a schematic end elevational view of the cover of a magazine constructed in accordance with the principles of the present invention engaging a correctly oriented tape cartridge.

As shown in FIG. 7, the standardized data cartridge 29 has receptacles or relieved areas 31, which are present in the data cartridge 29 for other purposes. When the data cartridge 29 is properly oriented in the magazine 1, these receptacles or relieved regions 31 will be in a position to engage the projections 30, permitting complete closure of the cover halves 3 and 4. Since the cover halves 3 and 4 are provided with a projection at each of the data carrier receptacles 18, if any one cartridge in the entire magazine is incorrectly inserted, proper closure will be prevented.

Although the cover halves are shown in the above embodiments as rotating around separate, parallel axes, they may alternatively both be journaled for rotation on a single, common pair of bearings on a single axis. In a region surrounding one or both of the bearings, the cover halves will overlap, and the rotary motion transfer can take place by means of cooperating cams, such as spiral cams, disposed on the overlapping surfaces.

Although other modifications and changes may be suggested by those skilled in the art, it is the intention of the inventors to embody within the patent warranted hereon all changes and modifications as reasonably and properly come within the scope of their contribution to the art.

We claim as our invention:

1. A system for holding data carriers comprising:
   a magazine having at least one receptacle therein for holding a data carrier and having a cover rotatable on a plurality of bearings between an open position exposing said receptacle and a closed position covering said receptacle;
   rotatable means engageable with one of said plurality of bearings for imparting rotary motion to said cover for opening and closing said cover; and
   stationary means, remote from said magazine, on which said rotatable means mounted, and relative to which said magazine is linearly moved to become engaged with and pushed by said rotatable means, for translating linear movement of said magazine into rotary movement of said rotatable means.

2. A system as claimed in claim 1 wherein one of said plurality of bearings has a keyed receptacle therein, and wherein said rotatable means comprises an axle having a free end which non-rotatably mates with said keyed receptacle, said axle having an exterior surface with a helical flight thereon, and wherein said stationary means comprises a stationary support for said axle having a bore therein through which axle extends, said bore having a stationary element therein engaging said flight.

3. A system as claimed in claim 2 further comprising means for urging said axle into engagement with said keyed receptacle.

4. A system as claimed in claim 3 wherein said means for urging comprises a spring surrounding said exterior surface of said axle.

* * * * *